US010589840B2

(12) United States Patent
Brown et al.

(10) Patent No.: US 10,589,840 B2
(45) Date of Patent: Mar. 17, 2020

(54) UNDERCARRIAGE-MOUNTED AIRFOIL

(71) Applicant: The Boeing Company, Chicago, IL (US)

(72) Inventors: John Joseph Brown, Costa Mesa, CA (US); Neal A. Harrison, Lake Forest, CA (US)

(73) Assignee: The Boeing Company, Chicago, IL (US)

(*) Notice: Subject to any disclaimer, the term of this patent is extended or adjusted under 35 U.S.C. 154(b) by 413 days.

(21) Appl. No.: 15/435,959

(22) Filed: Feb. 17, 2017

(65) Prior Publication Data

US 2018/0237121 A1     Aug. 23, 2018

(51) Int. Cl.
| | | |
|---|---|---|
| *B64C 9/02* | (2006.01) | |
| *B64C 9/36* | (2006.01) | |
| *B64C 17/00* | (2006.01) | |
| *B64C 25/16* | (2006.01) | |
| *B64C 25/00* | (2006.01) | |
| *B64C 9/16* | (2006.01) | |
| *B64C 25/10* | (2006.01) | |

(52) U.S. Cl.
CPC .......... *B64C 9/36* (2013.01); *B64C 9/02* (2013.01); *B64C 9/16* (2013.01); *B64C 17/00* (2013.01); *B64C 25/001* (2013.01); *B64C 25/10* (2013.01); *B64C 25/16* (2013.01)

(58) Field of Classification Search
CPC .... B64C 9/34; B64C 9/36; B64C 9/02; B64C 25/001; B64C 25/10; B64C 25/16; B64C 17/00

See application file for complete search history.

(56) References Cited

U.S. PATENT DOCUMENTS

| | | | | |
|---|---|---|---|---|
| 2,354,116 A | * | 7/1944 | Hajek, Jr. ............... | B64C 25/10 244/102 R |
| 2,511,362 A | * | 6/1950 | Mercier ................... | B64C 25/16 244/202 |
| 2010/0084509 A1 | * | 4/2010 | Weaver ................... | B64C 25/16 244/102 R |

OTHER PUBLICATIONS

Fokker DR-1Triplane—https://en.wikipedia.org/wiki/Fokker_Dr.I.
Russian TU-144—https://en.wikipedia.org/wiki/Tupolev_Tu-144.

\* cited by examiner

*Primary Examiner* — Philip J Bonzell
*Assistant Examiner* — Tye William Abell
(74) *Attorney, Agent, or Firm* — Miller, Matthias & Hull LLP

(57) ABSTRACT

An aircraft nose gear-mounted flight control device promotes aircraft stability during low-speed phases of flight, including take-offs and landings. The flight control device is an operable airfoil secured to an aircraft nose gear, either to a vertical support strut or to a wheel axle thereof. The airfoil is deployed when the nose gear is deployed, and is retracted when the nose gear is retracted. Upon deployment, the airfoil is effective to at least provide aircraft pitch control. In some configurations, the airfoil deploys as two separate but mirror-imaged left and right airfoil components that move in concert to provide pitch control. In other configurations, the airfoil components move at relatively different angular rates and amounts to provide both pitch and roll control. The entire airfoil may be pivotal for pitch control, or may instead be fixed, but have moveable flaps or flap-like portions that provide pitch control.

20 Claims, 7 Drawing Sheets

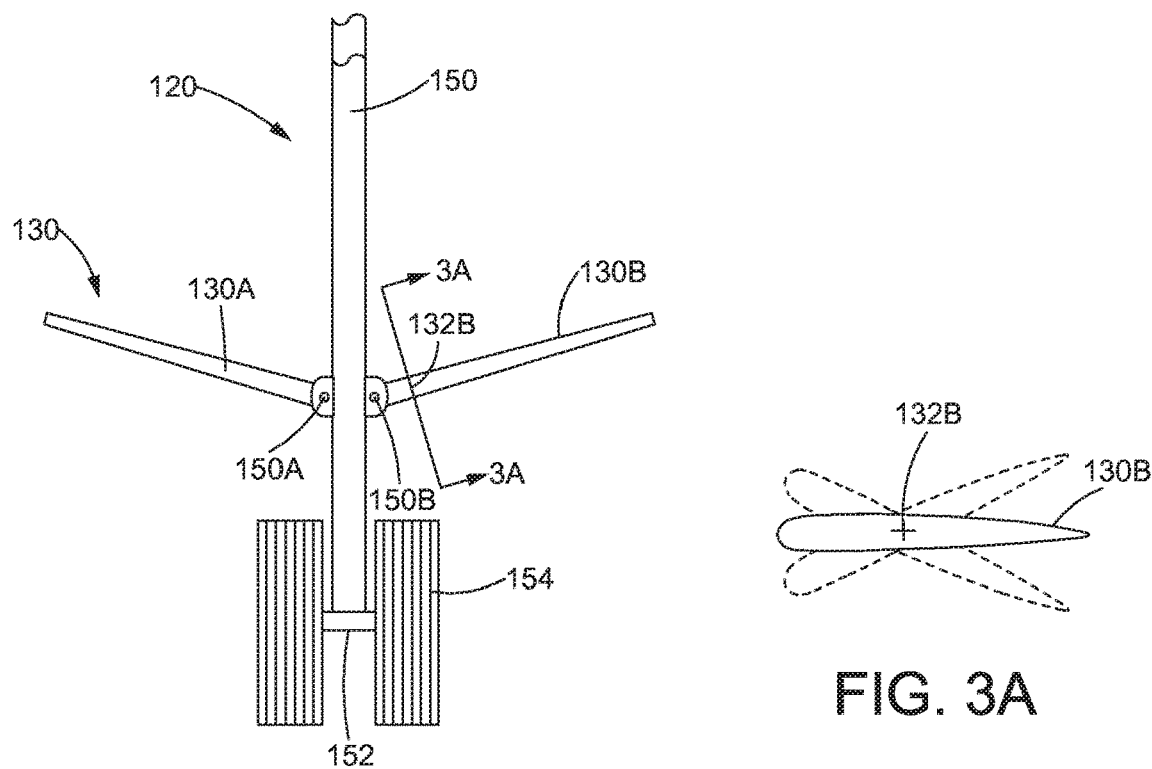
FIG. 3
FIG. 3A
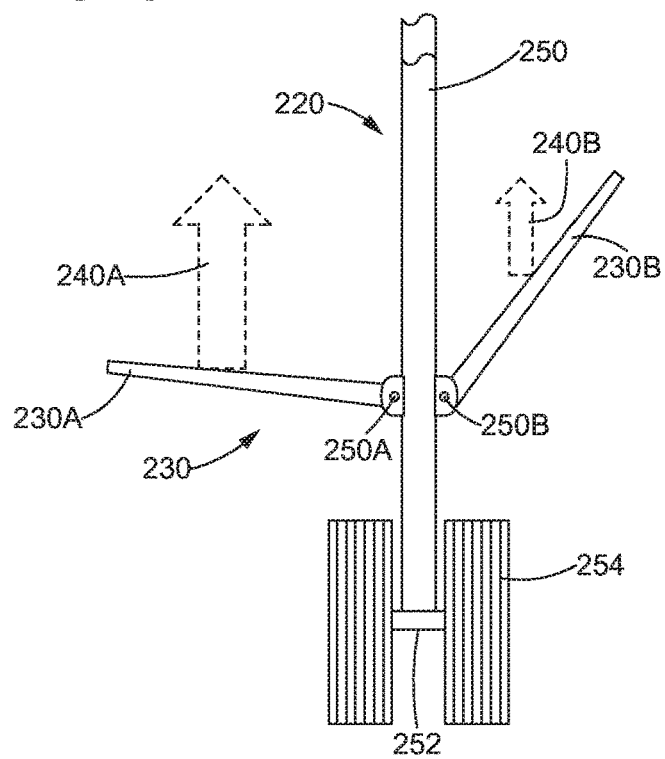
FIG. 4

US 10,589,840 B2

1

UNDERCARRIAGE-MOUNTED AIRFOIL

FIELD

The present disclosure relates generally to aircraft flight controls, and more specifically to undercarriage-mounted flight control devices for improving aircraft stability during low-speed phases of flight, including take-offs and landings.

BACKGROUND

Maintaining in-flight attitude stability of aircraft during low-speed flight, and particularly those having highly-swept wings, has always presented challenges, particularly during takeoff and landing phases of flight. Normally, in a dynamic flight environment, real-time speed changes, including those related to deployment of wing flaps, will cause shifting of center of lift of an aircraft away from its center of gravity. Countervailing lift forces of elevators, typically situated on the tail of the aircraft, are mostly effectively utilized to offset such shifts by positively controlling aircraft pitch.

In the case of tailless aircraft, however, as may be the case for certain drones or other unmanned flight vehicles, deployment of elevators is not an option. Absence of elevator control can be particularly detrimental, not only from a stability perspective, but for loss of high lift performance when flaps may not safely be used. As a result, and in order to compensate, vehicle approach speeds must be significantly higher. In addition, not having the assistance of elevators during turbulence can result in upset and/or even catastrophic loss of the aircraft in extreme situations.

SUMMARY

In accordance with one form of the present disclosure, a retractable aircraft control device is secured to an aircraft undercarriage. In one form, the control device may be secured to a retractable landing gear, such that when the landing gear is deployed the airfoil is deployed, and when the landing gear is retracted, the airfoil is retracted and/or stowed. When deployed, the airfoil is effective to at least provide aircraft pitch control.

In accordance with another form of the present disclosure, an aircraft has a retractable gear, and a flight control device is mounted on the gear. The flight control device is a moveably operable airfoil that is deployed when the gear is deployed, and is stowed when the gear is retracted.

In accordance with yet another form of the present disclosure, a method of enhancing flight control of an aircraft during low-speed flight includes steps of affixing an airfoil to a retractable gear of an aircraft; configuring the airfoil to deploy when the gear is deployed; configuring the airfoil to retract when the gear is retracted; configuring the airfoil to move to control at least pitch of the airplane when deployed; wherein the airfoil is stowed when the gear is retracted.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

FIG. 3 is perspective frontal view of a nose gear of the aircraft of FIG. 1, including another alternative embodiment of the nose gear airfoil, constructed in accordance with the present disclosure.

FIG. 3A is a side elevation of the nose gear airfoil of FIG. 3, taken along lines 3A-3A thereof.

FIG. 4 is a perspective frontal view of yet another embodiment of a nose gear-mounted airfoil, constructed in accordance with the present disclosure.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the disclosure. Actual scope of the disclosure is as defined in the appended claims.

Figure 2:
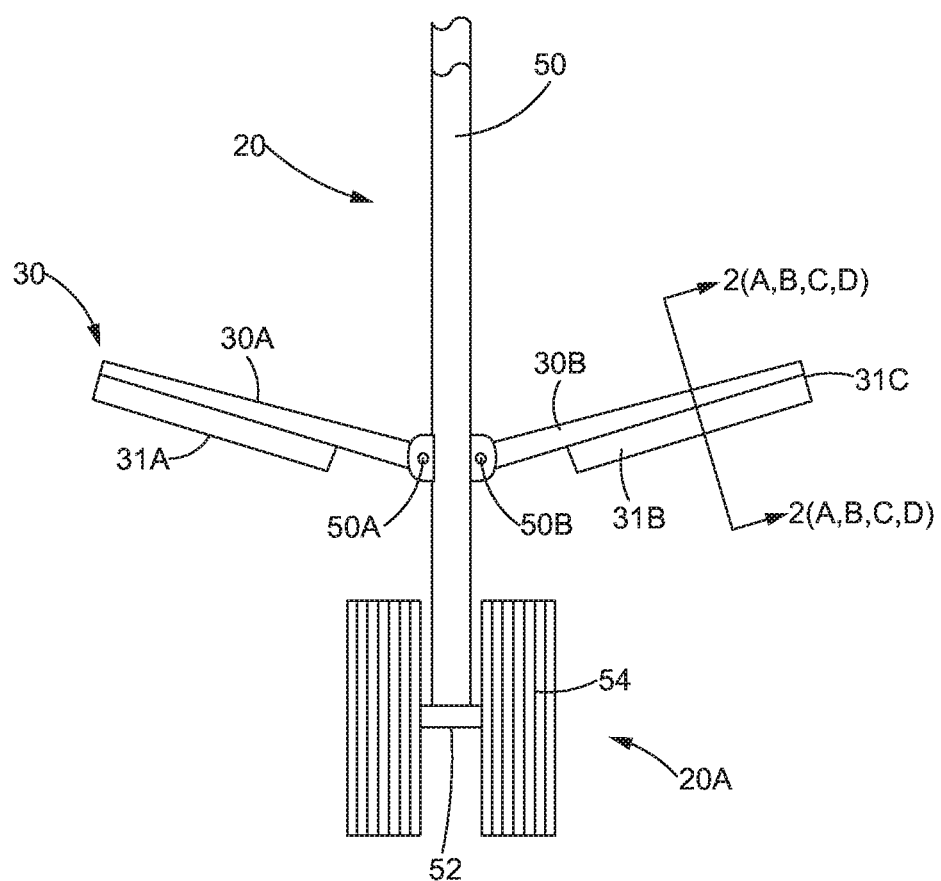
FIG. 2 is a perspective frontal view of a nose gear of the aircraft of FIG. 1, including the nose gear airfoil of FIG. 1, configured in accordance with the present disclosure.

With respect to specific numbered references of elements depicted in the drawings, as each new embodiment is introduced, elements that remain similar to their previously introduced counterparts will share similarly numbered relationships, though each variation is distinguished by a multiple of one hundred. For example, the vertical support strut 50 of nose gear 20 of FIG. 2 is similarly described and referenced as element 150 in FIG. 3, 250 in FIG. 4, 350 in FIG. 5, etc.

Figure 1:
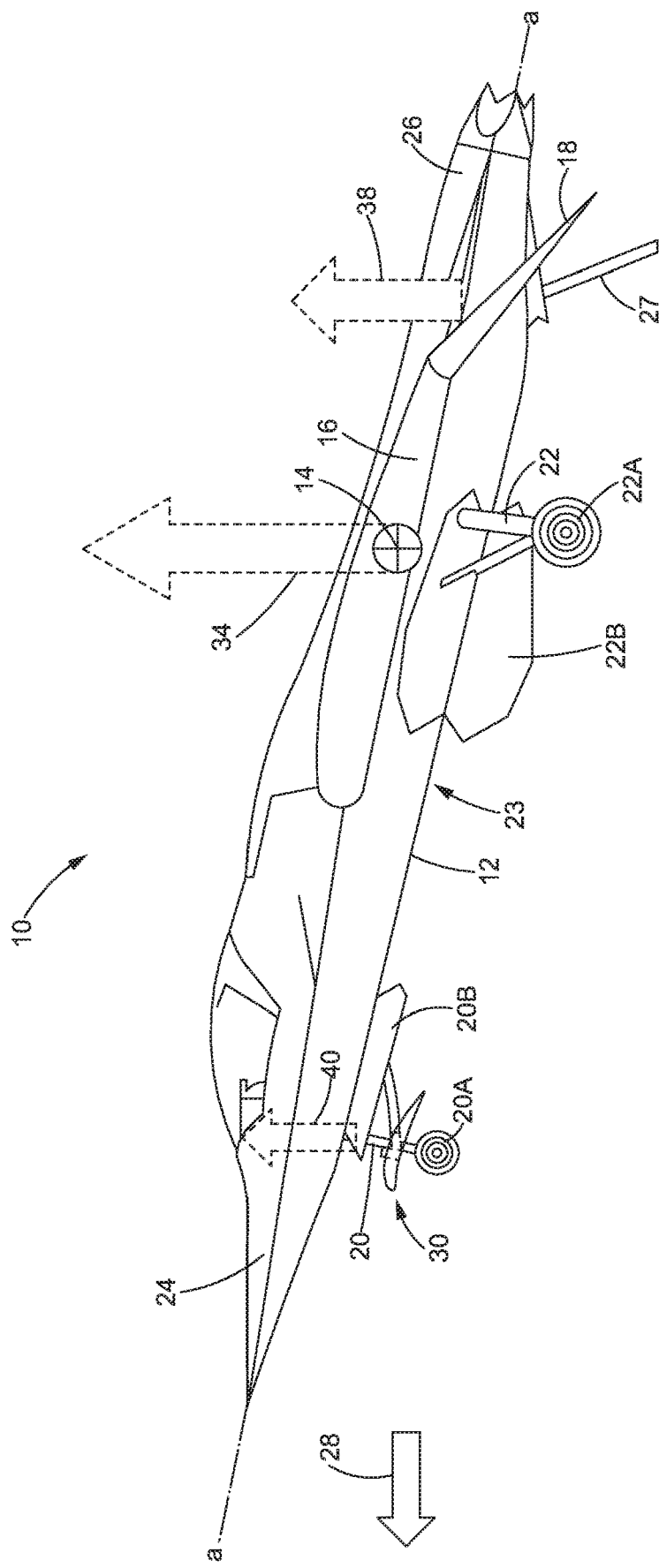
FIG. 1 is a schematic perspective side view of an aircraft in flight, shown in a pitch stabilized state under a balance of forces, shown as vectors, including a center of lift vector at a wing, an offsetting lift vector at a flap, and a counteracting pitch vector generated by an airfoil mounted on the nose gear of the aircraft, in accordance with the present disclosure.

Referring initially to FIG. 1, an aircraft 10, such as a drone used in unmanned flight, is shown in a pitch stabilized state of "trimmed" flight. The aircraft 10 includes a main body or fuselage 12 oriented along a longitudinal axis "a-a", and having a center of gravity 14. The aircraft further includes a pair of wings 16 (only one of which is shown), each wing extending laterally outwardly of the fuselage 12, and each wing 16 having a trailing edge flap 18 (only one of which is shown). The aircraft 10 includes a retractable nose-positioned landing gear 20 (also called a nose gear) having wheels 20A, and a retractable nose gear door 20B. The aircraft 10 also includes a main landing gear 22 having a set of wheels 22A, and a retractable main gear door 22B. The landing gears 20, 22, wheels 20A and 22A, and the gear doors 20B and 22B, collectively define elements of a so-called aircraft undercarriage 23, broadly defined herein as the bottom or underside of the entire aircraft 10.

The aircraft 10 further includes a nose 24, from which the nose gear 20 deploys, and a tail 26, the latter including a tail hook 27 for arrest and/or capture of the aircraft 10 upon landing. In this embodiment, the tail 26 is without conventional in-flight controls, including vertically extending rudder and/or horizontally extending elevator devices. In FIG. 1, the aircraft 10 is shown moving along a flight path indicated by the arrow 28. For providing low-speed stable flight, including takeoff and landing, an airfoil 30 is operably secured to the nose gear 20 to aid in achieving desired vertical pitch while the flaps 18 are deployed.

Ideally, a center of lift 34, depicted as an imaginary (i.e., shown in phantom) vertically oriented force vector 34, passes through the center of gravity 14 during stabilized flight. Various aerodynamic forces acting on the aircraft 10 while in flight may include a corresponding vertically oriented flap vector 38 generated by the flaps 18, which can shift the center of lift 34 rearward along the longitudinal axis a-a, i.e. away from the center of gravity 14 to cause the nose 24 to pitch or rotate downwardly. However, the airfoil 30, operably secured to the nose gear 20, can generate an offsetting pitch vector 40 to counteract the flap vector 38, as shown. The pitch vector 40 is depicted to be shorter than the flap vector 38 because the pitch vector 40 has a substantially longer moment arm about the center of gravity 14, as those skilled in the art will appreciate.

Although not shown in FIG. 1, it is also envisioned that for some aircraft configurations the airfoil 30 could be secured to a main landing gear, as the gear 22, rather than to the nose gear 20. In such cases, an airfoil 30 could be utilized on each of two laterally spaced main landing gears 22, as part of a typical tricycle landing gear arrangement. Thus, one airfoil would be mounted to each main landing gear 22 to assure aerodynamic balance during flight, as those skilled in the art will appreciate. However, since two airfoils 30 would be employed, each could be only half-sized, as compared to when only one is utilized (e.g. as on the nose gear 20). Moreover, the main landing gears 22 would need to be sufficiently spaced apart from the aircraft's center of gravity 14, i.e., measured along the aircraft's longitudinal axis a-a, for the two laterally spaced airfoils 30 to be effective, unlike main landing gear 22 of FIG. 1. Of course, the closer, longitudinally, that the main landing gear is situated to the center of gravity 14, the physically larger in size the two main gear airfoils would need to be for achieving any given level of effectiveness.

Referring now also to FIG. 2, the nose gear 20 is shown in a deployed state, and includes a vertical support strut 50 to which the nose gear-mounted airfoil 30 is operably secured, as shown. In FIG. 2, it will be apparent that the wheel 20A (of FIG. 1) includes a pair of physical wheel structures 54, as well as a wheel-supporting axle 52. It may also be noted that the airfoil 30 includes two mirror-imaged left and right airfoil components 30A and 30B, having trailing edge flaps 31A and 31B, respectively. The airfoil components 30A and 30B are depicted as fully extended into their deployed and locked positions to form a positive dihedral angle of the two components; i.e. an upward angle with respect to the horizontal, as those skilled in the art will appreciate. For deployment of the nose gear-mounted airfoil 30, the left and right airfoil components 30A and 30B are shifted downwardly from the vertical support strut 50, rotating about their respective connection joints 50A and 50B, to thus move outwardly and away from their stowed positions adjacent the vertical support strut 50.

Figure 2A:
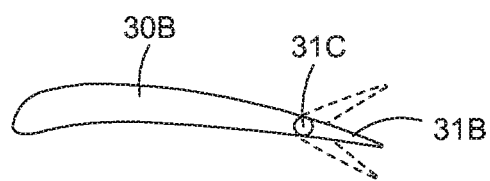
FIGS. 2A, 2B, 2C, and 2D are side views of various alternative embodiments of the nose gear airfoil of FIG. 2, taken along lines 2-2 (A-D) thereof.

FIG. 2A depicts a side view of a first embodiment of the airfoil component 30B along with its trailing edge flap 31B, the latter view taken along lines 2A-2A of FIG. 2 to show actual deflection limits of the flap 31B in phantom. In the embodiment of FIGS. 2 and 2A, the airfoil components 30A and 30B are connected to the strut 50 in the deployed and locked positions of the connection joints 50A and 50B. In this first described embodiment, only the trailing edge flaps 31A and 31B are operably controllable. The flaps 31A and 31B are pivotally secured to their respective airfoil components 30A and 30B via joints 31C.

Figure 2B:
Figure 2C:
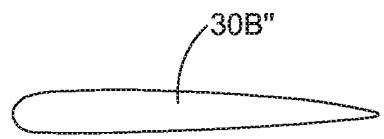
Figure 2D:
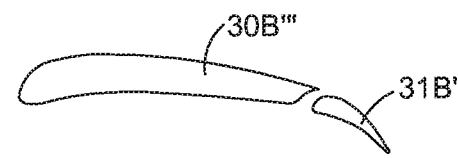

Referring now to FIGS. 2B, 2C, and 2D, three additional alternative embodiments of the airfoil components 30B are displayed, as would also be viewed along lines 2-2 (B, C, D) of FIG. 2. In FIG. 2B, a cambered airfoil 30B' may be contrasted with a straight or "un-cambered" airfoil component 30B" of FIG. 2C. A segmented airfoil component 30B''' in FIG. 2D, is a cambered variant of the first described flap embodiment of FIG. 2A. In each of the alternative embodiments, the two mirror-imaged left and right airfoil components 30A and 30B are configured to move in concert upon deployment, which occurs whenever the nose gear 20 of the aircraft 10 is extended or deployed from its retracted and/or stowed state.

Referring now to FIGS. 3 and 3A, a nose gear 120 is provided with an airfoil 130, attached to a vertical support strut 150. The airfoil 130 comprises a pair of straight airfoil components 130A and 130B, similar to that of the airfoil component 30B" depicted in FIG. 2C. In FIG. 3A, it will be noted that since this airfoil embodiment has no separate flap component, such as embodiments of FIGS. 2A and 2D, the airfoil component 130B is operably controlled by the pivoting of its entire structure about the joint 132B to adjust or "articulate" pitch angles upon instantaneous demand (e.g. during turbulence) for maintaining properly stabilized flight. As such, the airfoil components are configured to be actively moveable during flight for control of at least pitch of the aircraft 10, as herein disclosed. In drones, or even in manned aircraft, such control may be managed by onboard computer programs.

Referring now to FIG. 4, a nose gear 220 is provided with another embodiment of an airfoil 230, attached to a vertical support strut 250. In this embodiment, mirror-imaged left and right airfoil components 230A and 230B are configured to move non-symmetrically, both with respect to angular rates of movement, as well as in their comparative amounts of movement. As such, each airfoil component 230A and 230B is relatively movable with respect to the other, rather than movable in concert as the previously described airfoil components. This differential action adds a capability of roll control about a roll axis, which is coincident with the longitudinal axis a-a of the aircraft 10 (FIG. 1). Thus, the embodiment of FIG. 4 is configured to control pitch as well as roll movements of the aircraft 10, as exemplified by the relative force difference between a lift vector 240A acting on the left airfoil component 230A, and a smaller lift vector 240B acting on the airfoil component 230B, as depicted. Such force differential imparts a lateral force imbalance, causing the aircraft to roll clockwise about the axis a-a; i.e. from a reference point facing the nose gear 220 of FIG. 4. Under such differential, the left airfoil component 230A will rise upwardly, while the right airfoil component 230B will move downwardly.

Figure 5:
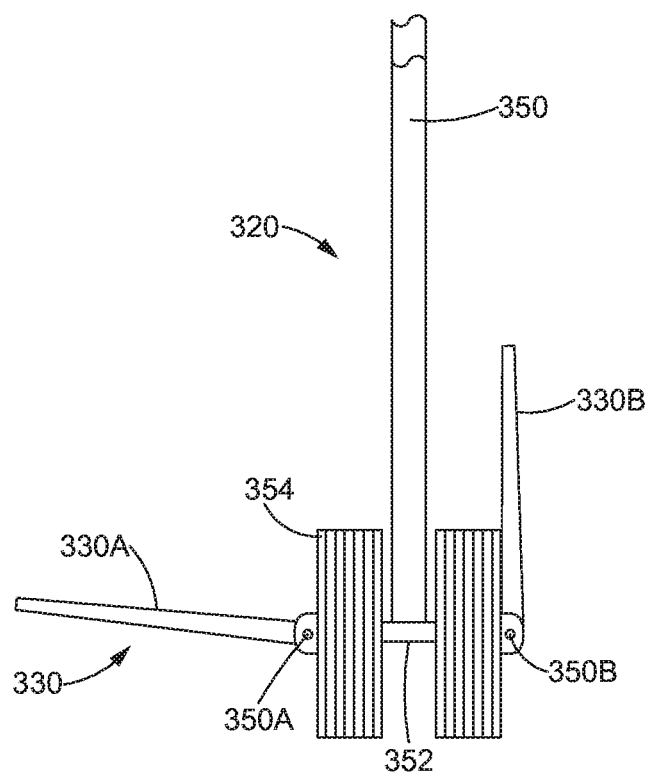
FIG. 5 is a perspective frontal view of a nose gear of the aircraft of FIG. 1, including another alternative embodiment of the nose gear airfoil, constructed in accordance with the present disclosure.

Referring now to FIG. 5, a nose gear 320 is provided with another embodiment of an airfoil 330, attached to a vertical support strut 350. In this embodiment, mirror-imaged left and right airfoil components 330A and 330B move in concert, as the embodiments of FIGS. 2 and 3, but are pivotally supported by joints 350A and 350B lockable to an axle 352, rather than having their attachments lockable to mid-portions the nose support strut 350, as in the case of the previously described airfoil components. In FIG. 5, just for convenience, the left airfoil component 330A is shown in its deployed or operational state, while the right airfoil component 330B is shown in its retracted or stowed position.

Figure 6:
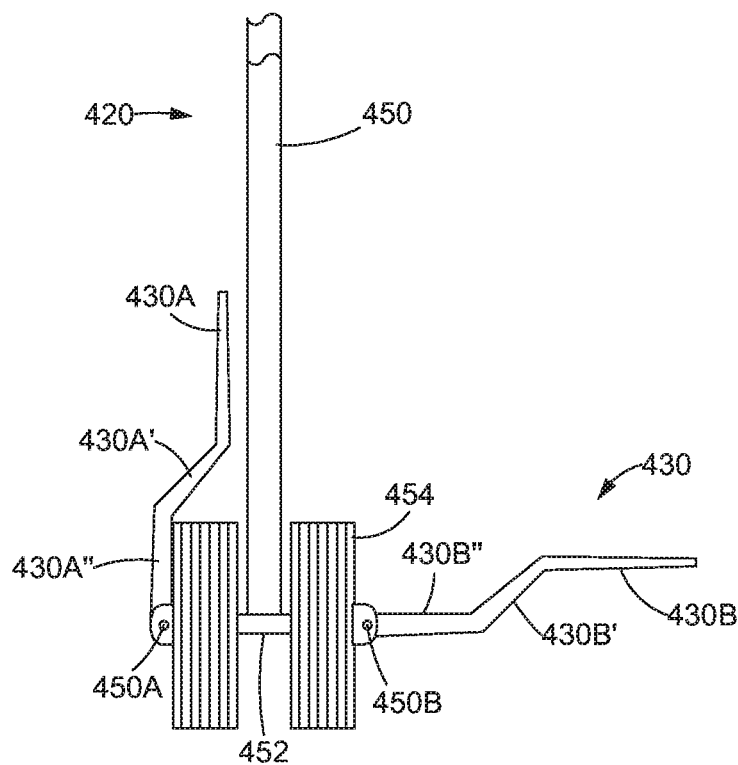
FIG. 6 is a perspective frontal view of a nose gear of the aircraft of FIG. 1, including yet another alternative embodiment of the nose gear airfoil, constructed in accordance with the present disclosure.

Referring now to FIG. 6, a nose gear 420 is provided with yet another embodiment of an airfoil 430, also attached to an axle bogie 452. In this embodiment, mirror-imaged left and right airfoil components, 430A and 430B, again move in concert as embodiments of FIGS. 2, 3, and 5, and are pivotally supported at lockable joints 450A and 450B fixed to the axle 452, similar to the embodiment of FIG. 5. However, in this embodiment, left and right cambered airfoil components are each configured with three angled subsections. For example, the right airfoil component 430, shown deployed, includes subsections 430B, 430B', and 430B". In FIG. 6, the left airfoil component, defined by subsections 430A, 430A', and 430A", is depicted in a stowed position. Of course, in operation, both left and right airfoils will be either deployed or stowed; the split views provided herein are only for convenience of viewing respective deployed and stowed states. The stowed state also enables the airfoil 430 to be efficiently packaged for storage within the gear well.

Figure 7:
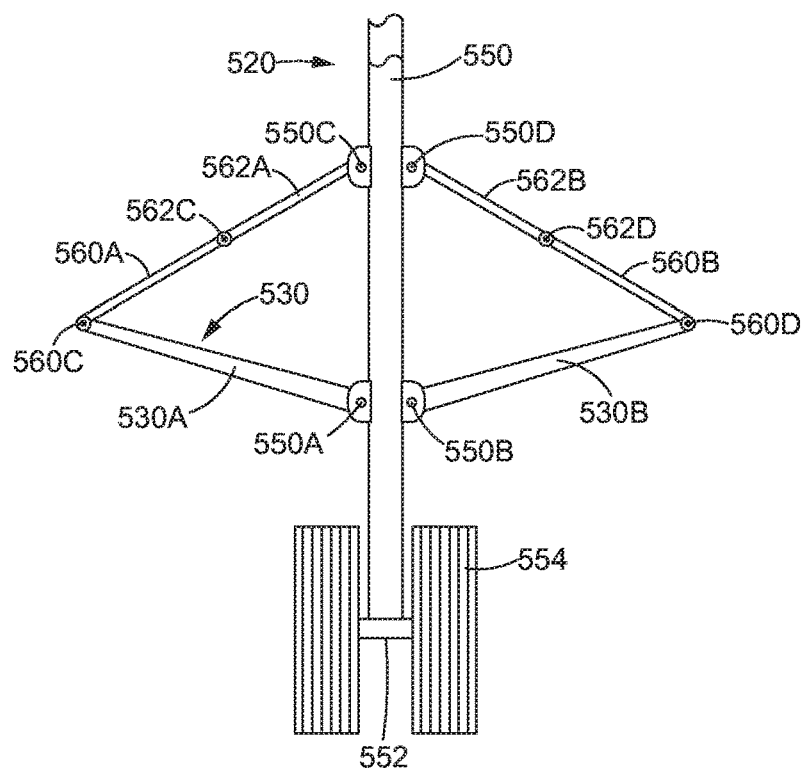
FIG. 7 is a perspective frontal view of another embodiment of a nose gear of the aircraft of FIG. 1.
Figure 8:
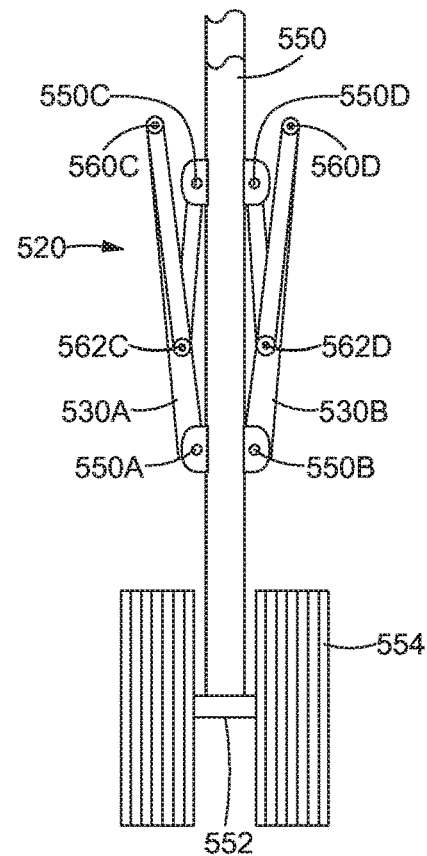
FIG. 8 is a perspective frontal view of the same embodiment of the nose gear of FIG. 7, but shown in a retracted state.

FIGS. 7 and 8 depict another embodiment of a nose gear-mounted airfoil 530 directly attached to a nose gear support strut 550 of a nose gear 520 rather than to a wheel axle. In FIG. 7 the left and right airfoil components 550A and 550B are shown fully deployed and operational, while in FIG. 8 the same airfoil components are shown fully retracted. Thus, in reference to FIG. 7, retractable left and right airfoil support linkages 560A and 560B are coupled directly to the ends of respective left and right airfoil components 530A, 530B via left and right coupling joints 560C and 560D, as shown. At their opposite ends, the left and right airfoil support linkages 560A and 560B are coupled to respective companion linkages 562A and 562B, which are, in turn, directly coupled to the nose gear support strut 550 at their respective coupling joints 550C and 550D. Referring to FIG. 8, it will be apparent that the above-described support and companion linkages are configured to collapse together about their respective coupling joints in the nature of an umbrella to achieve retraction of the left and right airfoil components 550A and 550B. Conversely, the companion linkages are expanded apart to achieve the full deployment state depicted in FIG. 7. Those skilled in the art will appreciate that the described arrangement is only one of many options for achieving deployment and stowage of the depicted airfoil components.

Figure 9:
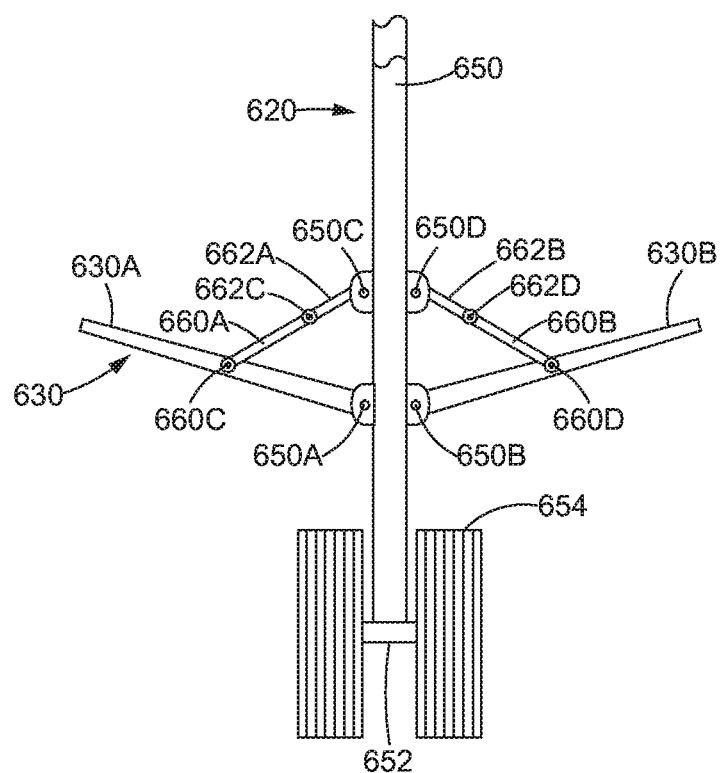
FIG. 9 is a perspective frontal view of another embodiment of a nose gear of the aircraft of FIG. 1.

Referring now to FIG. 9, a nose gear 620 is provided with another embodiment of an airfoil 630, attached to a vertical support strut 650. In this embodiment, mirror-imaged left and right airfoil components, 630A and 630B, again move in concert similar to the described embodiments of FIGS. 2, 3, 5, 6, 7 and 8, and the airfoil components are again pivotally supported by similar joints 650A and 650B. However, left and right support linkages 660A and 660B are attached in this embodiment to mid-span portions of the airfoil components 630A and 630B via respective joints 660C and 660D. This is unlike the latter described coupling joints 560C and 560D of FIGS. 7 and 8, which are affixed to ends of the previously described airfoil components 530A and 530B. On the other hand, the left and right airfoil support linkages 660A and 660B are coupled to companion linkages 662A and 662B, and operate in similar telescoping fashion as the support and companion linkages of the embodiment described in FIGS. 7 and 8.

Figure 10:
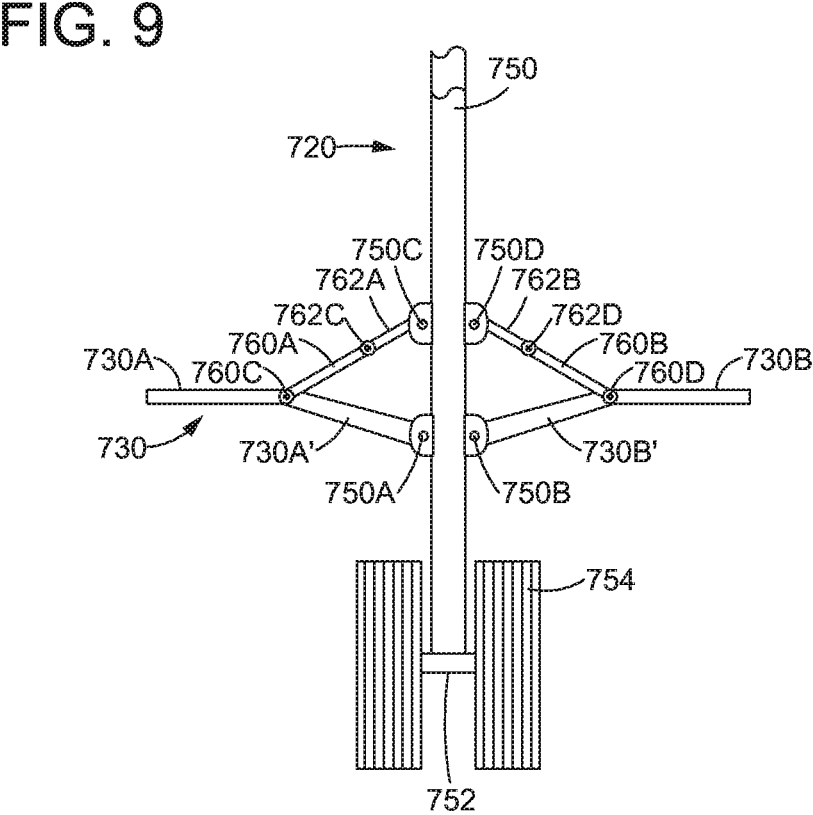
FIG. 10 is a perspective frontal view of another embodiment of a nose gear of the aircraft of FIG. 1.

Referring now to FIG. 10, an alternate form of the mid-span attachment embodiment of FIG. 9 utilizes a cambered airfoil 730, which has left and right airfoil components that are segmented. As such, the airfoil components define straight outboard segments 730A and 730B attached to angled inboard segments 730A' and 730B', respectively. In this embodiment, only the inboard segments 730A' and 730B' reflect a positive dihedral angle.

Figure 11:
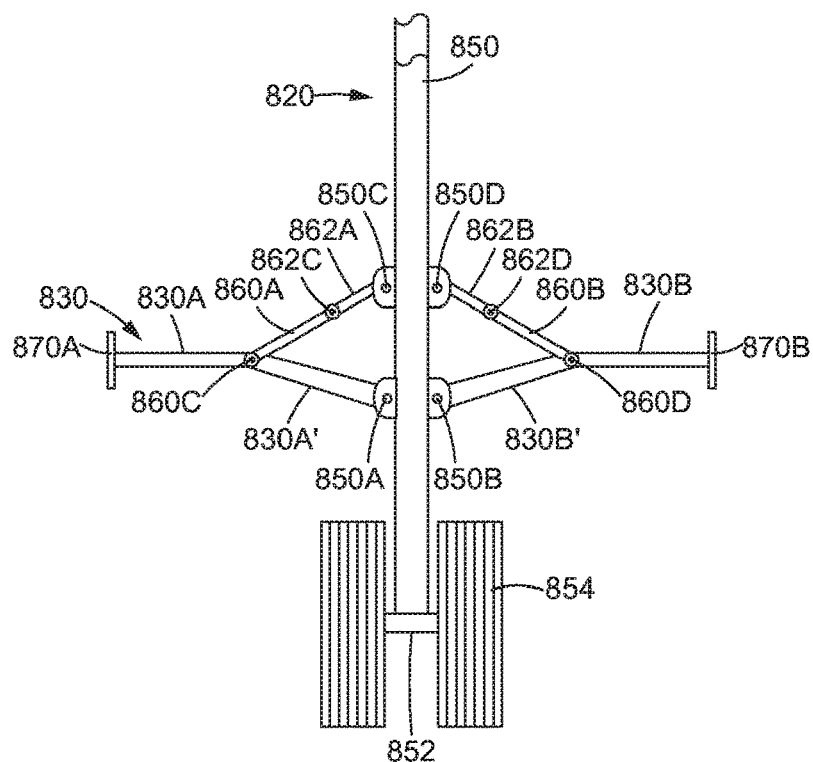
FIG. 11 is a perspective frontal view of another embodiment of a nose gear of the aircraft of FIG. 1.

Referring now to FIG. 11, a variation of the mid-span attachment embodiment of FIG. 10 includes a cambered airfoil 830 that includes outboard segments 830A and 830B. The latter segments have vertically oriented outboard elements 870A and 870B that provide lateral directional stability control to augment performance capabilities of the airfoil 830. The outboard elements 870A and 870B may also serve as end-plates to accommodate increased loads on the airfoil 830, as those skilled in aircraft component design may appreciate.

Figure 12:
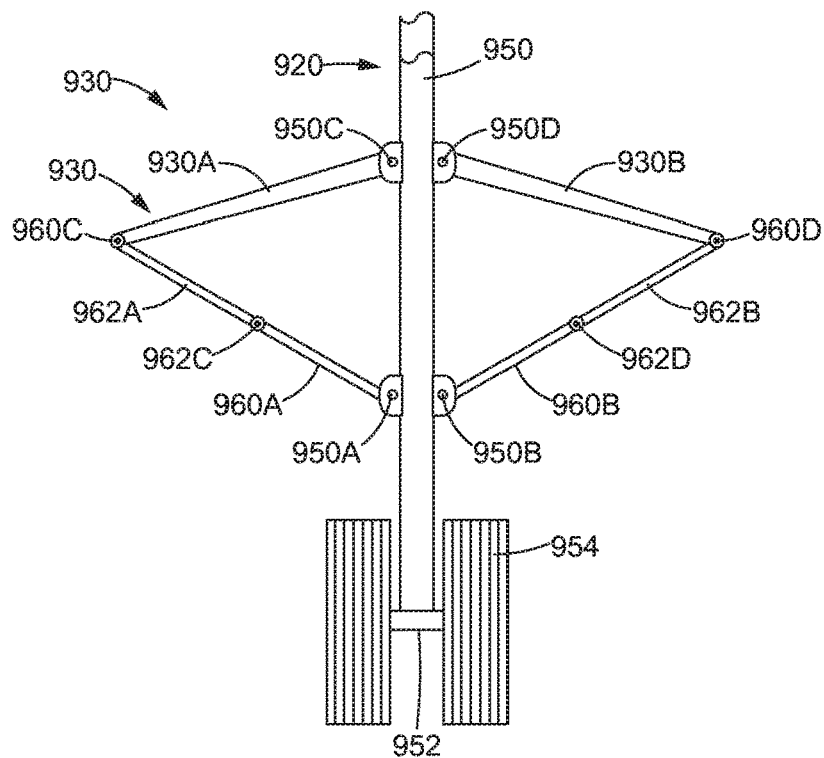
FIG. 12 is a perspective frontal view of another embodiment of a nose gear of the aircraft of FIG. 1.

Finally, FIG. 12 depicts yet another embodiment of an airfoil 930, which includes left and right airfoil components 930A and 930B that provide a negative dihedral angle. In this embodiment, however, left and right airfoil support linkages 960A and 960B, as well as their coupled companion linkages 962A and 962B, are physically positioned below the airfoil 930, as shown in a deployed state. Nevertheless, the support and companion linkages operate in similar collapsing and expanding (telescoping) fashion as the support and companion linkages of their previously described counterpart embodiments.

The disclosed embodiments of airfoils 30, 130, 230, etc. may have other variations and alternative constructions neither described nor suggested herein. For example, although described in terms of specific structures and components, other configurations and/or other components may be utilized, and potentially in other environments. Moreover, although the disclosure presents structures in only the shapes and sizes depicted, numerous variations of the disclosed structures may be envisioned for use in alternative embodiments, as may be appreciated by those skilled in the art.

What is claimed is:

1. A flight control device for an aircraft, the aircraft including an undercarriage; the flight control device comprising:
    an airfoil retractably mounted to the undercarriage, wherein the airfoil is extensible from the undercarriage, and includes a first coupling joint for pivotably securing an inboard extremity of the airfoil to the undercarriage, a second coupling joint on the airfoil spaced outboard of the first coupling joint, and a support linkage that pivotally secures the second coupling joint to the undercarriage, wherein the airfoil pivots about the first coupling joint upon extension of the airfoil from the undercarriage.

2. The flight control device of claim 1, wherein the airfoil has a trailing edge flap.

3. The flight control device of claim 1, wherein the airfoil includes a vertically oriented outboard element to provide lateral directional stability control.

4. The flight control device of claim 1, wherein the airfoil is cambered.

5. The flight control device of claim 1, further comprising a retractable landing gear extensible from the undercarriage, wherein the airfoil is mounted to the retractable landing gear for deployment with the retractable landing gear during low-speed flight.

6. The flight control device of claim 5, wherein the landing gear is a nose gear.

7. The flight control device of claim 6, wherein the airfoil is deployed when the nose gear is deployed; wherein the airfoil is retracted when the nose gear is retracted; and wherein when deployed the airfoil provides aircraft pitch control.

8. The flight control device of claim 6, wherein the airfoil comprises at least two airfoil components, and the airfoil components are configured for aircraft pitch and roll movements.

9. The flight control device of claim 8, wherein the at least two airfoil components are left and right airfoil components configured to move differentially about a roll axis of the aircraft, each airfoil component being relatively movable with respect to the other at different angular rates and amounts.

10. The flight control device of claim 6, wherein the airfoil comprises at least two airfoil components, and the airfoil components are configured for pitch control movements.

11. The flight control device of claim 10, wherein the nose gear includes a vertical support strut, and further includes a pair of support and companion linkages attached to the vertical support strut; wherein the support and companion linkages are also attached to the airfoil components; and wherein the airfoil components are configured for deployment by telescoping movement of the linkages.

12. The flight control device of claim 10, wherein the deployed airfoil components comprise a positive dihedral angle.

13. The flight control device of claim 10, wherein the deployed airfoil components comprise a negative dihedral angle.

14. An aircraft having a retractable gear, and a flight control device mounted on the gear; the flight control device comprising:

an airfoil operably secured to the gear;
wherein the airfoil is deployed when the gear is deployed; and
wherein the airfoil is retracted when the gear is retracted; and
wherein, the airfoil includes a first coupling joint for pivotably securing an inboard extremity thereof to the retractable gear, a second coupling joint on the airfoil spaced outboard of the first coupling joint, and a support linkage that pivotally secures the second coupling joint to the retractable gear, wherein the airfoil pivots about the first coupling joint upon deployment from the retractable gear.

15. The aircraft of claim 14, wherein the airfoil is mounted on an axle of the gear.

16. The aircraft of claim 14, wherein the airfoil is configured to control pitch of the aircraft.

17. The aircraft of claim 14, wherein the airfoil is configured to control pitch and roll of the aircraft.

18. The aircraft of claim 14, wherein the airfoil comprises at least left and right airfoil components; wherein the gear includes a vertical support strut having a pair of support and companion linkages attached to the vertical support strut; wherein the support and companion linkages are also attached to the left and right airfoil components; and wherein the airfoil components are configured for deployment by telescoping movement of the linkages.

19. The aircraft of claim 18, wherein the left and right airfoil components are configured to move differentially about a roll axis of the aircraft, each airfoil component being relatively movable with respect to the other at different angular rates and amounts.

20. A method of enhancing control of an aircraft during low-speed flight; the method comprising steps of:

forming an airfoil having a first coupling joint for pivotably securing an inboard extremity thereof to a retractable gear of an aircraft, a second coupling joint on the airfoil spaced outboard of the first coupling joint, and a support linkage that pivotally secures the second coupling joint to the retractable gear;
configuring the airfoil to deploy when the gear is deployed, wherein upon deployment of the retractable gear the airfoil pivots about the first coupling joint;
affixing the airfoil to the retractable gear;
configuring the airfoil to retract when the gear is retracted; and
configuring the airfoil to be moveable during flight to actively control the airplane when deployed.

* * * * *